United States Patent
Styles et al.

(10) Patent No.: US 9,677,460 B2
(45) Date of Patent: Jun. 13, 2017

(54) BRANCH COMMUNICATION VALVE FOR A TWIN SCROLL TURBOCHARGER

(71) Applicant: Ford Global Technologies, LLC, Dearborn, MI (US)

(72) Inventors: Daniel Joseph Styles, Canton, MI (US); Jack Adams, Belleville, MI (US); Keith Michael Plagens, Northville, MI (US); Neal James Corey, Canton, MI (US); David Born, Commerce Township, MI (US); Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 14/727,563

(22) Filed: Jun. 1, 2015

(65) Prior Publication Data
US 2015/0260085 A1    Sep. 17, 2015

Related U.S. Application Data

(62) Division of application No. 13/829,599, filed on Mar. 14, 2013, now Pat. No. 9,068,501.

(Continued)

(51) Int. Cl.
| | |
|---|---|
| *F02D 23/00* | (2006.01) |
| *F02B 33/44* | (2006.01) |
| *F16K 11/07* | (2006.01) |
| *F02B 37/02* | (2006.01) |
| *F02B 37/12* | (2006.01) |
| *F01D 9/02* | (2006.01) |
| *F01D 17/10* | (2006.01) |

(Continued)

(52) U.S. Cl.
CPC ........... *F02B 37/025* (2013.01); *F01D 9/026* (2013.01); *F01D 17/10* (2013.01); *F02B 33/38* (2013.01); *F02B 37/12* (2013.01); *F02B 37/18* (2013.01); *F05D 2220/40* (2013.01); *F05D 2240/40* (2013.01); *F05D 2260/60* (2013.01); *Y02T 10/144* (2013.01)

(58) Field of Classification Search
CPC ...................................................... F01D 17/10
USPC ........... 60/602, 605.1; 137/625.48, 114, 597
See application file for complete search history.

(56) References Cited

U.S. PATENT DOCUMENTS

| | | | |
|---|---|---|---|
| 3,423,926 A * | 1/1969 | Holzhausen | ............ F01D 9/026 60/602 |
| 3,973,592 A * | 8/1976 | Cleaver | ............... F16K 11/0833 137/625.43 |

(Continued)

FOREIGN PATENT DOCUMENTS

EP        0247631 A1    5/1987

*Primary Examiner* — Phutthiwat Wongwian
*Assistant Examiner* — Ngoc T Nguyen
(74) *Attorney, Agent, or Firm* — Julia Voutyras; McCoy Russell LLP

(57) ABSTRACT

Methods and systems are provided for a branch communication valve in a twin turbocharger system. A branch communication valve may be positioned adjacent to a dividing wall separating a first scroll and a second scroll of the twin turbocharger. In an open position, the branch communication valve increases fluid communication between the first scroll and the second scroll and in a closed position, the branch communication valve decreases fluid communication between the first scroll and the second scroll.

3 Claims, 9 Drawing Sheets

Related U.S. Application Data

(60) Provisional application No. 61/759,888, filed on Feb. 1, 2013.

(51) Int. Cl.
    *F02B 33/38*     (2006.01)
    *F02B 37/18*     (2006.01)

(56) References Cited

U.S. PATENT DOCUMENTS

| | | |
|---|---|---|
| 4,506,703 A | 3/1985 | Baron |
| 4,543,996 A | 10/1985 | Baron |
| 4,623,001 A | 11/1986 | Vogler et al. |
| 5,046,317 A | 9/1991 | Satokawa |
| 5,172,725 A | 12/1992 | Kitagawa |
| 5,943,864 A | 8/1999 | Sumser et al. |
| 5,967,185 A | 10/1999 | Baruschke et al. |
| 6,269,643 B1 | 8/2001 | Schmidt et al. |
| 7,441,586 B2 | 10/2008 | Chung et al. |
| 7,637,106 B2 | 12/2009 | Hertweck et al. |
| 7,828,517 B2 | 11/2010 | Serres |
| 7,837,771 B2 | 11/2010 | Barone |
| 2011/0302917 A1 | 12/2011 | Styles et al. |
| 2013/0014502 A1 | 1/2013 | Sato |

\* cited by examiner

FIG. 2
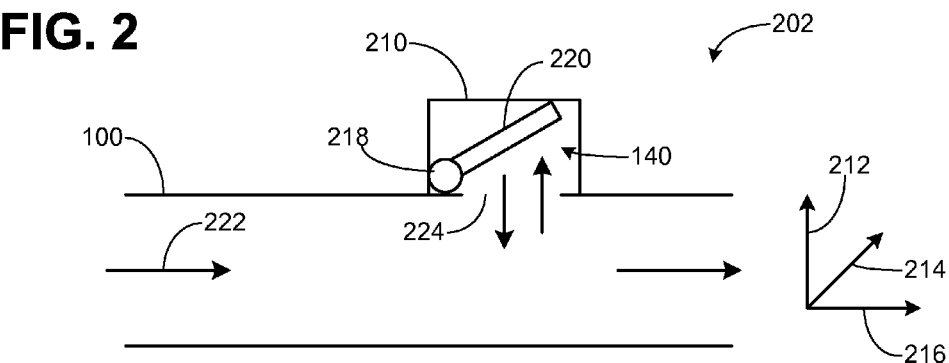
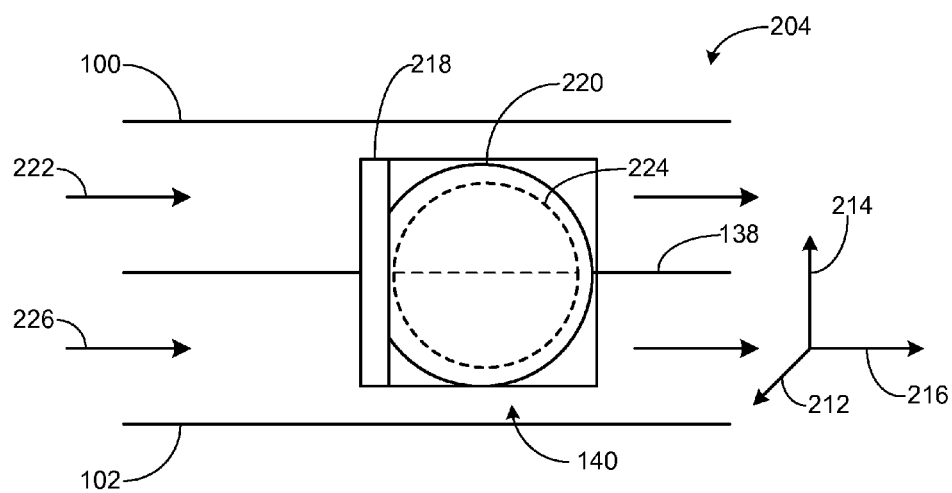
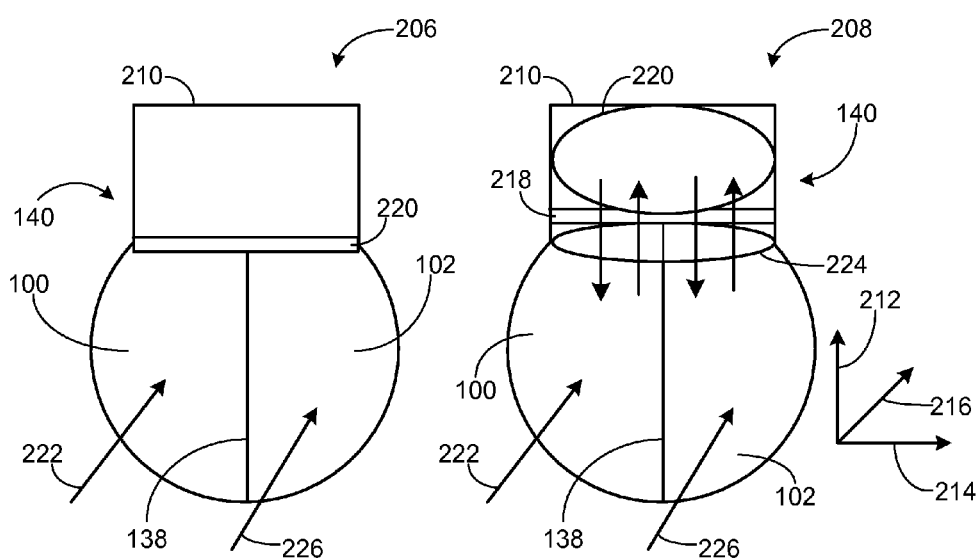

FIG. 7
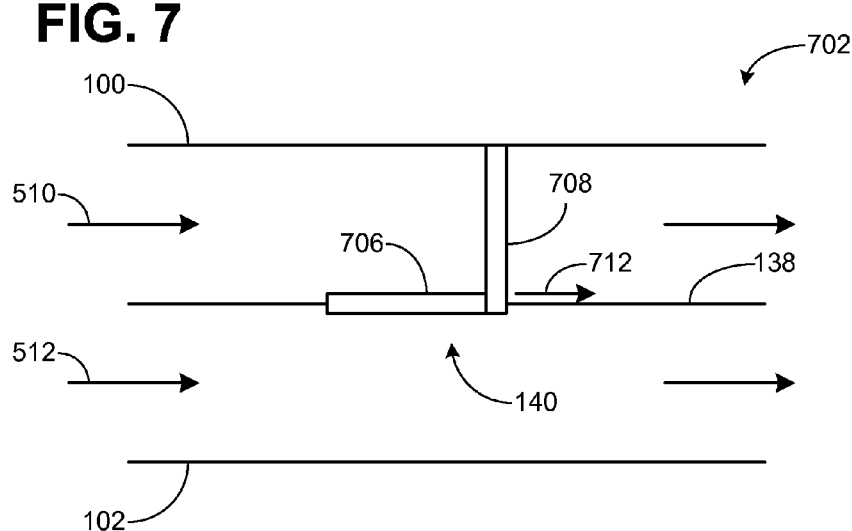
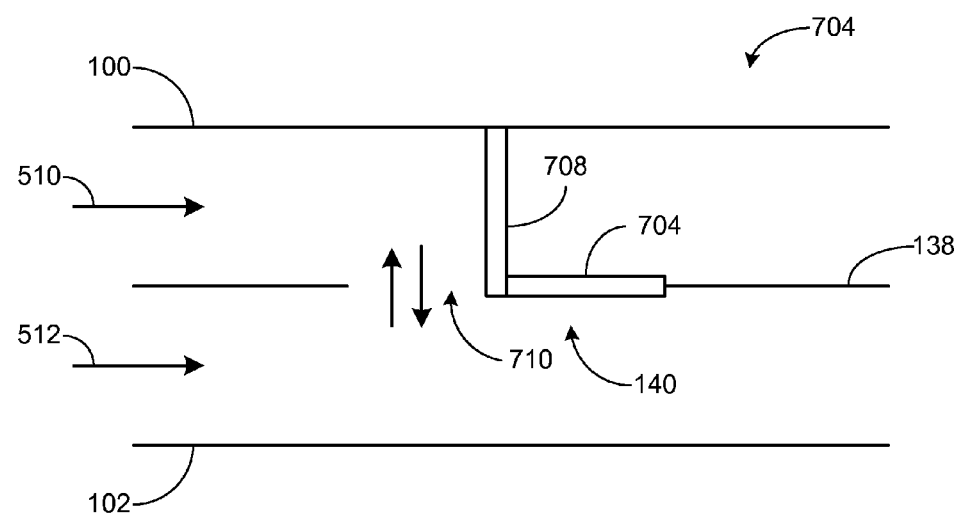
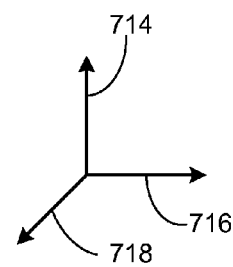

FIG. 9
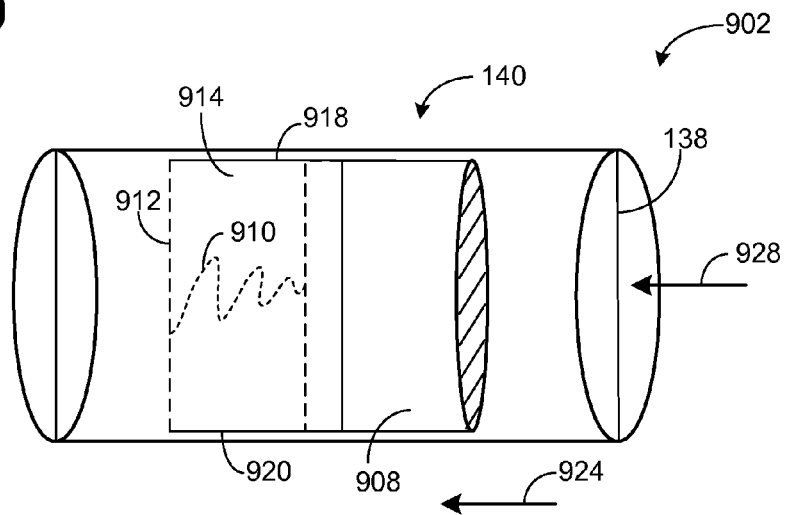
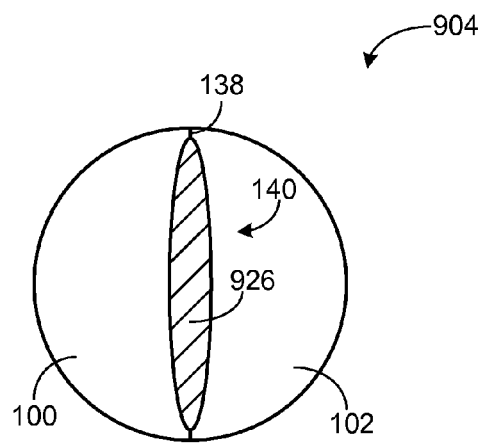
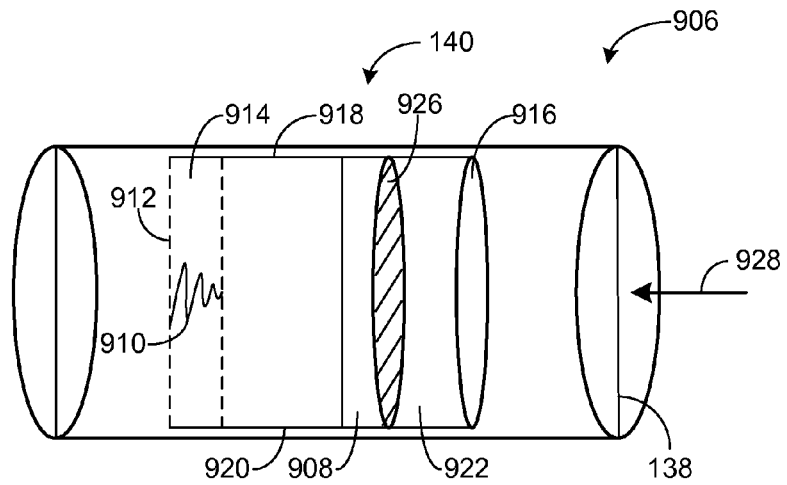

BRANCH COMMUNICATION VALVE FOR A TWIN SCROLL TURBOCHARGER

CROSS REFERENCE TO RELATED APPLICATIONS

The present application is a divisional of U.S. patent application Ser. No. 13/829,599, entitled "BRANCH COMMUNICATION VALVE FOR A TWIN SCROLL TURBOCHARGER," filed on Mar. 14, 2013, which claims priority to U.S. Provisional Patent Application No. 61/759,888, filed on Feb. 1, 2013, the entire contents of each of which are hereby incorporated by reference for all purposes.

BACKGROUND/SUMMARY

Twin scroll turbocharger configurations may be used in turbocharged engines. A twin scroll turbocharger configuration may separate an inlet to a turbine into two separate passages connected to exhaust manifold runners so that exhaust from engine cylinders whose exhaust gas pulses may interfere with each other are separated.

For example, on an I4 engine with a cylinder firing order of 1-3-4-2, exhaust manifold runners 1 and 4 may be connected to a first inlet of a twin scroll turbine and exhaust manifold runners 2 and 3 may be connected to a second inlet of said twin scroll turbine, where the second inlet is different from the first inlet. Separating exhaust gas pulses in this way may, in some examples, result in an increase in efficiency of exhaust gas delivery to a turbine.

However, the inventors herein have recognized that under some engine operating conditions separating exhaust gas pulses as described above may reduce an efficiency of exhaust gas delivery to a turbine. For example, the inventors herein have recognized that under certain engine operating conditions, e.g., high speed and high load conditions, separating exhaust gas pulses as described above may result in an increase in backpressure and pumping work due to, for example, an increase in exhaust gas enthalpy.

In one example, the issues described above may be addressed by positioning a branch communication valve between a first scroll and a second scroll in a twin (e.g., dual) turbocharger scroll system. In one example, the first scroll and the second scroll may be fluidically separated by a dividing wall. A passage may be positioned vertically above the dividing wall and bridge the first scroll and the second scroll. The branch communication valve may be positioned within the passage. In an open position, exhaust flowing through the first and second scrolls may enter the passage and flow into the opposite scroll. In a closed position, the branch communication valve may seal against an opening between the passage and the first and the second scrolls, thereby reducing fluid communication between the scrolls.

In another example, a branch communication valve may be positioned within and/or adjacent to the dividing wall. The branch communication valve may be movable between an open and closed position. In a closed position, a portion of the branch communication valve may cover and seal against a hole or opening in the dividing wall. In an open position, the hole or opening may be exposed such that fluid communication between the first and second scrolls increases.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a first embodiment of a branch communication valve for a twin scroll turbocharger system.

FIG. 7 shows a sixth embodiment of a branch communication valve for a twin scroll turbocharger system.

FIG. 9 shows an eighth embodiment of a branch communication valve for a twin scroll turbocharger system.

DETAILED DESCRIPTION

Figure 1:
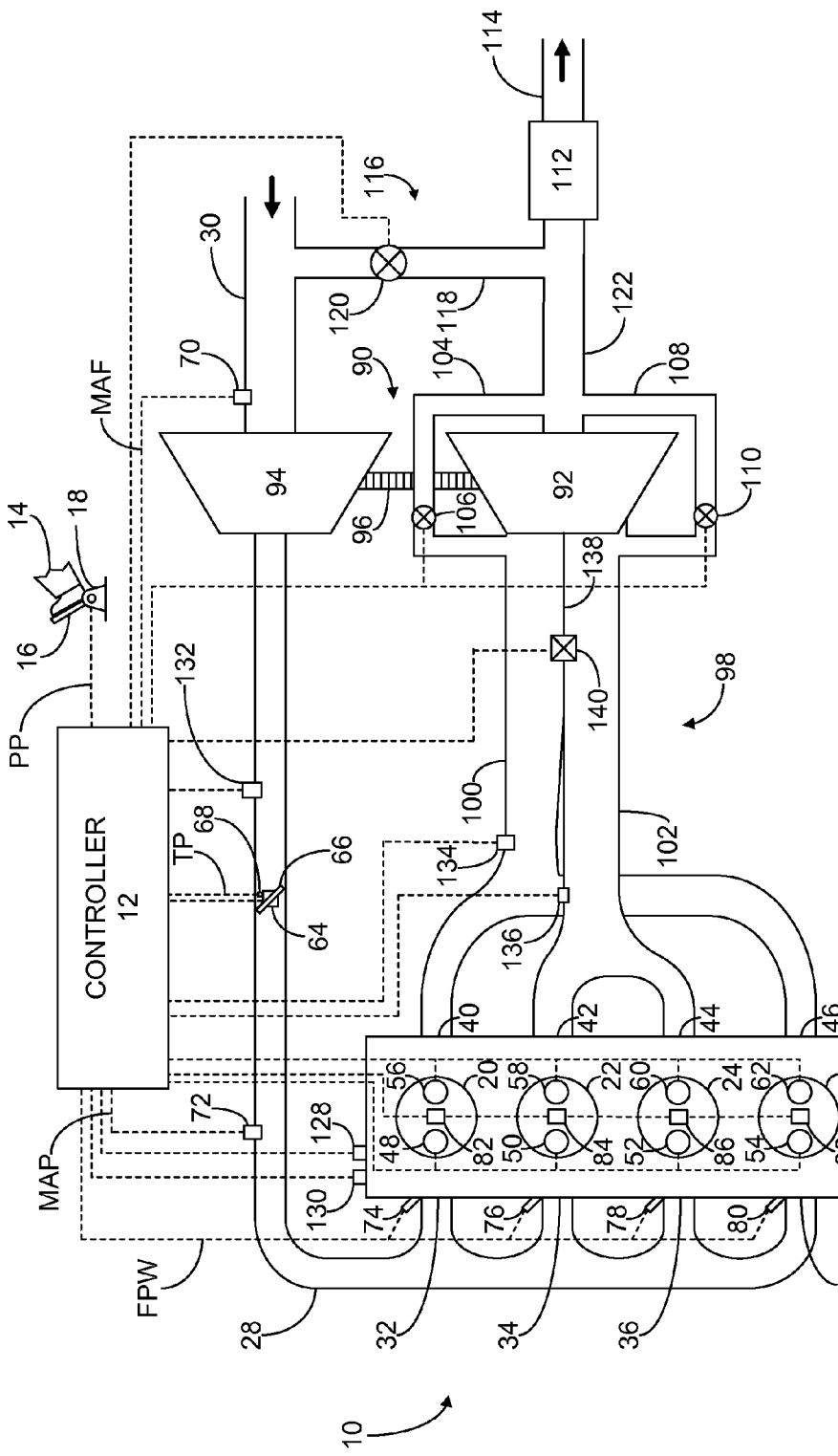
FIG. 1 shows a schematic diagram of an engine including a twin scroll turbocharger and a branch communication valve.

The following description relates to a branch communication valve to control fluid communication between a first and second scroll in a twin or dual scroll turbocharger system. As shown in FIG. 1, a first scroll and a second scroll may be fluidically separated by a dividing wall. As such, exhaust gases from different engine cylinders may be routed into separate passages connecting to the first and second scrolls. This may allow separation of different, and potentially interfering, exhaust gas pulses before entering a turbine, thereby increasing exhaust gas delivery to the turbine and increasing engine efficiency. However, under certain engine operating conditions, separating the exhaust gas pulses may reduce engine efficiency. Under these conditions, increased fluid communication between the first and second scrolls may be desired. Thus, a branch communication valve may be used to increase or decrease fluid communication between the first and second scrolls. For example, the branch communication valve may be positioned within or adjacent to the dividing wall. Opening the branch communication valve may allow increased fluid communication between the first and second scrolls, while closing the branch communication valve may reduce fluid communication between the first and second scrolls. Different embodiments of the branch communication valve are presented at FIGS. 2-9.

Turning now to FIG. 1, a schematic diagram of an engine 10, which may be included in a propulsion system of an automobile, is shown. Engine 10 may be controlled at least partially by a control system including controller 12 and by input from a vehicle operator 14 via an input device 16. In this example, input device 16 includes an accelerator pedal and a pedal position sensor 18 for generating a proportional pedal position signal PP.

Engine 10 may include a plurality of combustion chambers (i.e., cylinders). In the example shown in FIG. 1, Engine 10 includes combustion chambers 20, 22, 24, and 26, arranged in an inline 4 configuration. It should be understood, however, that though FIG. 1 shows four cylinders, engine 10 may include any number of cylinders in any configuration, e.g., V-6, I-6, V-12, opposed 4, etc.

Though not shown in FIG. 1, each combustion chamber (i.e., cylinder) of engine 10 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 10.

Each combustion chamber may receive intake air from an intake manifold 28 via an air intake passage 30. Intake manifold 28 may be coupled to the combustion chambers via intake ports. For example, intake manifold 28 is shown in FIG. 1 coupled to cylinders 20, 22, 24, and 26 via intake ports 32, 34, 36, and 38 respectively. Each respective intake port may supply air and/or fuel to the respective cylinder for combustion.

Each combustion chamber may exhaust combustion gases via an exhaust port coupled thereto. For example, exhaust ports 40, 42, 44 and 46, are shown in FIG. 1 coupled to cylinders 20, 22, 24, 26, respectively. Each respective exhaust port may direct exhaust combustion gases from a respective cylinder to an exhaust manifold or exhaust passage.

Each cylinder intake port can selectively communicate with the cylinder via an intake valve. For example, cylinders 20, 22, 24, and 26 are shown in FIG. 1 with intake valves 48, 50, 52, and 54, respectively. Likewise, each cylinder exhaust port can selectively communicate with the cylinder via an exhaust valve. For example, cylinders 20, 22, 24, and 26 are shown in FIG. 1 with exhaust valves 56, 58, 60, and 62, respectively. In some examples, each combustion chamber may include two or more intake valves and/or two or more exhaust valves.

Though not shown in FIG. 1, in some examples, each intake and exhaust valve may be operated by an intake cam and an exhaust cam. Alternatively, one or more of the intake and exhaust valves may be operated by an electromechanically controlled valve coil and armature assembly. The position of an intake cam may be determined by an intake cam sensor. The position of exhaust cam may be determined by an exhaust cam sensor.

Intake passage 30 may include a throttle 64 having a throttle plate 66. In this particular example, the position of throttle plate 66 may be varied by controller 12 via a signal provided to an electric motor or actuator included with throttle 64, a configuration that is commonly referred to as electronic throttle control (ETC). In this manner, throttle 64 may be operated to vary the intake air provided the combustion chambers. The position of throttle plate 66 may be provided to controller 12 by throttle position signal TP from a throttle position sensor 68. Intake passage 30 may include a mass air flow sensor 70 and a manifold air pressure sensor 72 for providing respective signals MAF and MAP to controller 12.

In FIG. 1, fuel injectors are shown coupled directly to the combustion chambers for injecting fuel directly therein in proportion to a pulse width of a signal FPW received from controller 12 via an electronic driver, for example. For example, fuel injectors 74, 76, 78, and 80 are shown in FIG. 1 coupled to cylinders 20, 22, 24, and 26, respectively. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake passage 28 in a configuration that provides what is known as port injection of fuel into the intake ports upstream of combustion chambers. Though not shown in FIG. 1, fuel may be delivered to the fuel injectors by a fuel system including a fuel tank, a fuel pump, a fuel line, and a fuel rail.

The combustion chambers of engine 10 may be operated in a compression ignition mode, with or without an ignition spark. In some examples, a distributorless ignition system (not shown) may provide an ignition sparks to spark plugs coupled to the combustion chambers in response to controller 12. For example, spark plugs 82, 84, 86, and 88 are shown in FIG. 1 coupled to cylinders 20, 22, 24, and 26, respectively.

Engine 10 may include a turbocharger 90. Turbocharger 90 may be include a turbine 92 and a compressor 94 coupled on a common shaft 96. The blades of turbine 92 may be caused to rotate about the common shaft as a portion of the exhaust gas stream discharged from engine 10 impinges upon the blades of the turbine. Compressor 94 may be coupled to turbine 92 such that compressor 94 may be actuated when the blades of turbine 92 are caused to rotate. When actuated, compressor 94 may then direct pressurized fresh gas to air intake manifold 28 where it may then be directed to engine 10.

Engine 10 may employ a dual scroll (or twin scroll or two-pulse) turbocharger system 98 wherein at least two separate exhaust gas entry paths flow into and through turbine 92. A dual scroll turbocharger system may be configured to separate exhaust gas from cylinders whose exhaust gas pulses interfere with each other when supplied to turbine 92. For example, FIG. 1 shows a first scroll 100 and a second scroll 102 which are used to supply separate exhaust streams to turbine 92. The cross-sectional shape of first scroll 100 and second scroll 102 may be of various shapes, including circular, square, rectangular, D-shaped, etc. Example cross-sections (e.g., end-views) of the first and second scrolls are illustrated in FIGS. 2-9, discussed below.

For example, if a four-cylinder engine (e.g., an I4 engine such as shown in FIG. 1) has a firing sequence of 1-3-4-2 (e.g., cylinder 20 followed by cylinder 24 followed by cylinder 26 followed by cylinder 22), then cylinder 20 may be ending its expansion stroke and opening its exhaust valves while cylinder 22 still has its exhaust valves open. In a single-scroll or undivided exhaust manifold, the exhaust gas pressure pulse from cylinder 20 may interfere with the ability of cylinder 22 to expel its exhaust gases. However, by using a dual scroll system wherein exhaust ports 40 and 46 from cylinders 20 and 26 are connected to one inlet of the first scroll 100 and exhaust ports 42 and 44 from cylinders 22 and 24 are connected to the second scroll 102, exhaust pulses may be separated and pulse energy driving the turbine may be increased.

Turbine 92 may include at least one wastegate to control an amount of boost provided by said turbine. In a dual scroll system, each scroll may include a corresponding wastegate to control the amount of exhaust gas which passes through turbine 92. For example, in FIG. 1, the first scroll 100 includes a first wastegate 104. First wastegate 104 includes a wastegate valve 106 configured to control an amount of exhaust gas bypassing turbine 92. Likewise, the second scroll 102 includes a second wastegate 108. Second wastegate 108 includes a wastegate valve 110 configured to control an amount of exhaust gas bypassing turbine 92.

Exhaust gases exiting turbine 92 and/or the wastegates may pass through an emission control device 112. Emission control device 112 can include multiple catalyst bricks, in one example. In another example, multiple emission control devices, each with multiple bricks, can be used. In some examples, emission control device 112 may be a three-way type catalyst. In other examples, emission control device 112 may include one or a plurality of a diesel oxidation catalyst (DOC), selective catalytic reduction catalyst (SCR), and a diesel particulate filter (DPF). After passing through emission control device 112, exhaust gas may be directed to a tailpipe 114.

Engine 10 may include an exhaust gas recirculation (EGR) system 116. EGR system 116 may deliver a portion of exhaust gas exiting engine 10 into the engine air intake passage 30. The EGR system includes an EGR conduit 118 coupled to an exhaust passage 122, downstream of the turbine 92, and to the air intake passage 30. In some examples, EGR conduit 118 may include an EGR valve 120 configured to control an amount of recirculated exhaust gas. As shown in FIG. 1, EGR system 116 is a low pressure EGR system, routing exhaust gas from downstream of the turbine 92 to upstream of the compressor 94. In another example, a high pressure EGR system may be used in addition to or in place of the low pressure EGR system. As such, the high pressure EGR system may route exhaust gas from one or more of the scrolls 100 and 102, upstream of the turbine 92, to the intake passage 30, downstream of the compressor 34.

Under some conditions, EGR system 116 may be used to regulate the temperature and or dilution of the air and fuel mixture within the combustion chambers, thus providing a method of controlling the timing of ignition during some combustion modes. Further, during some conditions, a portion of combustion gases may be retained or trapped in the combustion chamber by controlling exhaust valve timing.

In some examples, controller 12 may be a conventional microcomputer including: a microprocessor unit, input/output ports, read-only memory, random access memory, keep alive memory, and a conventional data bus. Controller 12 is shown in FIG. 1 receiving various signals from sensors coupled to engine 10, in addition to those signals previously discussed, including: engine coolant temperature (ECT) from a temperature sensor 128; an engine position sensor 130, e.g., a Hall effect sensor sensing crankshaft position. Barometric pressure may also be sensed (sensor not shown) for processing by controller 12. In some examples, engine position sensor 130 produces a predetermined number of equally spaced pulses every revolution of the crankshaft from which engine speed (RPM) can be determined. Additionally, various sensors may be employed to determine turbocharger boost pressure. For example, a pressure sensor 132 may be disposed in intake 30 downstream of compressor 94 to determine boost pressure. Additionally, each scroll of the dual scroll system 98 may include various sensors for monitoring operating conditions of the duel scroll system. For example, the first scroll 100 may include an exhaust gas sensor 134 and the second scroll 102 may include an exhaust gas sensor 136. Exhaust gas sensors 134 and 136 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Exhaust gases flowing through the first scroll 100 and exhaust gases flowing through the second scroll 102 are separated by a dividing wall 138. As discussed above, separating the exhaust streams with the first and second scrolls may increase low end torque and time to torque. As such, separating the exhaust gas pulses in this way may, in some examples, result in an increase in efficiency of exhaust gas delivery to a turbine. However, under some engine operating conditions, separating exhaust gas pulses as described above may reduce the efficiency of exhaust gas delivery to the turbine. For example, during high speed and high engine load conditions, separating exhaust gas pulses as described above may result in an increase in backpressure and pumping work due to, for example, an increase in exhaust gas enthalpy. Thus, this may reduce the engine's power output.

Increasing fluid communication between the first and second scrolls during high speed and/or load conditions may allow increased engine efficiency and power output. A branch communication valve 140 may be positioned such that it bridges the first scroll 100 and the second scroll 102. As such, opening the branch communication valve 140 (e.g., BCV) may increase fluid communication between the first and second scrolls. Alternatively, closing the BCV 140 may decrease fluid communication between the first and second scrolls. The BCV concepts and embodiments described herein may be used in the dual scrolls within the turbocharger housing assembly and/or in the exhaust passages (e.g., scrolls as shown in FIG. 1) leading to the inlet of the turbocharger.

Increasing fluid communication may include allowing exhaust gases from the first scroll 100 and exhaust gases from the second scroll 102 to mix and enter the opposite scroll. For example, opening the BCV 140 may open a passage or recess between the first and second scrolls. In one example, the passage may be positioned in the dividing wall, between the two scrolls. In another example, the passage may be positioned on top of both scrolls. By opening the BCV valve 140, the exhaust streams may flow through the passage, thereby mixing and increasing fluid communication between the scrolls. Example embodiments of the BCV 140 are depicted in FIGS. 2-9, described further below.

FIGS. 2-7 and 9 show different example embodiments of the BCV 140. Specifically, these figures illustrate a first scroll and a second scroll of a dual scroll turbocharger, fluidically separated by a dividing wall. The dual scroll turbocharger further includes a passage positioned adjacent to the dividing wall and bridging the first scroll and the second scroll and a branch communication valve, positioned within the passage and movable between an open position and a closed position, the open position increasing fluid communication between the first scroll and the second scroll.

FIG. 2 shows a first embodiment of the branch communication valve depicted in FIG. 1. As shown in FIG. 2, the BCV 140 is a side-hinged poppet valve positioned in an adjacent passage 210. The passage 210 is positioned adjacent to a dividing wall 138, the dividing wall 138 separating a first scroll 100 and a second scroll 102. Specifically, the passage 210 is positioned on the top of, or vertically above with respect to a vertical axis 212 parallel to the dividing wall, the first scroll and the second scroll and bridges the two scrolls. The passage 210 includes an opening between the first scroll, the passage, and the second scroll. As such, the opening is from the first scroll, across the dividing wall, and to the second scroll. In an alternate example, the passage 210 may be positioned at the bottom, or vertically below with respect to the vertical axis 212, the first scroll and the second scroll.

FIG. 2 includes a side-view 202 of the first embodiment of the BCV 140 and passage 210. The side-view 202 shows a side view of one of the scrolls, such as the first scroll 100. The second scroll (not shown in side-view 202) is located behind, with respect to a lateral direction 214, the first scroll 100. The BCV 140 comprises a hinge 218 and a valve plate 220 (e.g., plate). The valve plate 220 may open and close by pivoting or rotating around the hinge 218. In the side-view 202, the BCV 140 is shown in an open position with the valve plate 220 near the top of the passage 210. Exhaust gases 222 flowing through the first scroll 100 and the second flow passage (not shown) may enter the passage 210 through an opening 224. The opening 224 bridges both the first scroll 100 and the second scroll.

FIG. 2 also includes a top-view 204 of the first embodiment of the BCV 140. As discussed above, the passage 210 and the opening 224 bridge both the first scroll 100 and the second scroll 102. In one example, as shown in FIG. 2, the passage 210 may be centered above (or below in an alternate example) the scrolls, along the dividing wall 138. In the top-view 204, the BCV 140 is closed. Thus, the valve plate 220 engages sealably at the bottom of the passage 210 with the opening 224 such that exhaust gases 222 from the first scroll 100 and exhaust gases 226 from the second scroll 102 may not enter the passage 210. In this position, there may be no fluid communication between the first scroll 100 and the second scroll 102.

FIG. 2 further includes a first end-view 206 wherein the BCV 140 is closed and a second end-view 208 wherein the BCV 140 is open. Exhaust gases 222 and 226 are traveling in the horizontal direction 216 in the first scroll 100 and the second scroll 102, respectively. In the first end-view 206, fluid communication between the scrolls is restricted by the diving wall 138 and the closed valve plate 220 of BCV 140. In the second end-view 208, the BCV 140 is open such that the valve plate 220 is not covering the opening 224. As such exhaust gases 224 from the first scroll 100 may flow through the passage 210, mix with exhaust gases 226 from the second scroll 102, and enter the second scroll 102. Similarly, exhaust gases 226 from the second scroll 102 may flow through the passage 210, mix with exhaust gases 224 from the first scroll 100, and enter the first scroll 100. As such, when the BCV 140 is in the open position, fluid communication between the two scrolls increases.

The system of FIG. 2 provides for a dual scroll turbocharger system including a first scroll and a second scroll. The first scroll and the second scroll may be fluidically separated by a dividing wall. The system further includes a passage positioned adjacent to the dividing wall and bridging the first scroll and the second scroll. A branch communication valve may be positioned within the passage. The branch communication valve may have a plate rotatable about a hinge, the plate sealable against an opening between the passage and the first and the second scrolls.

Figure 3:
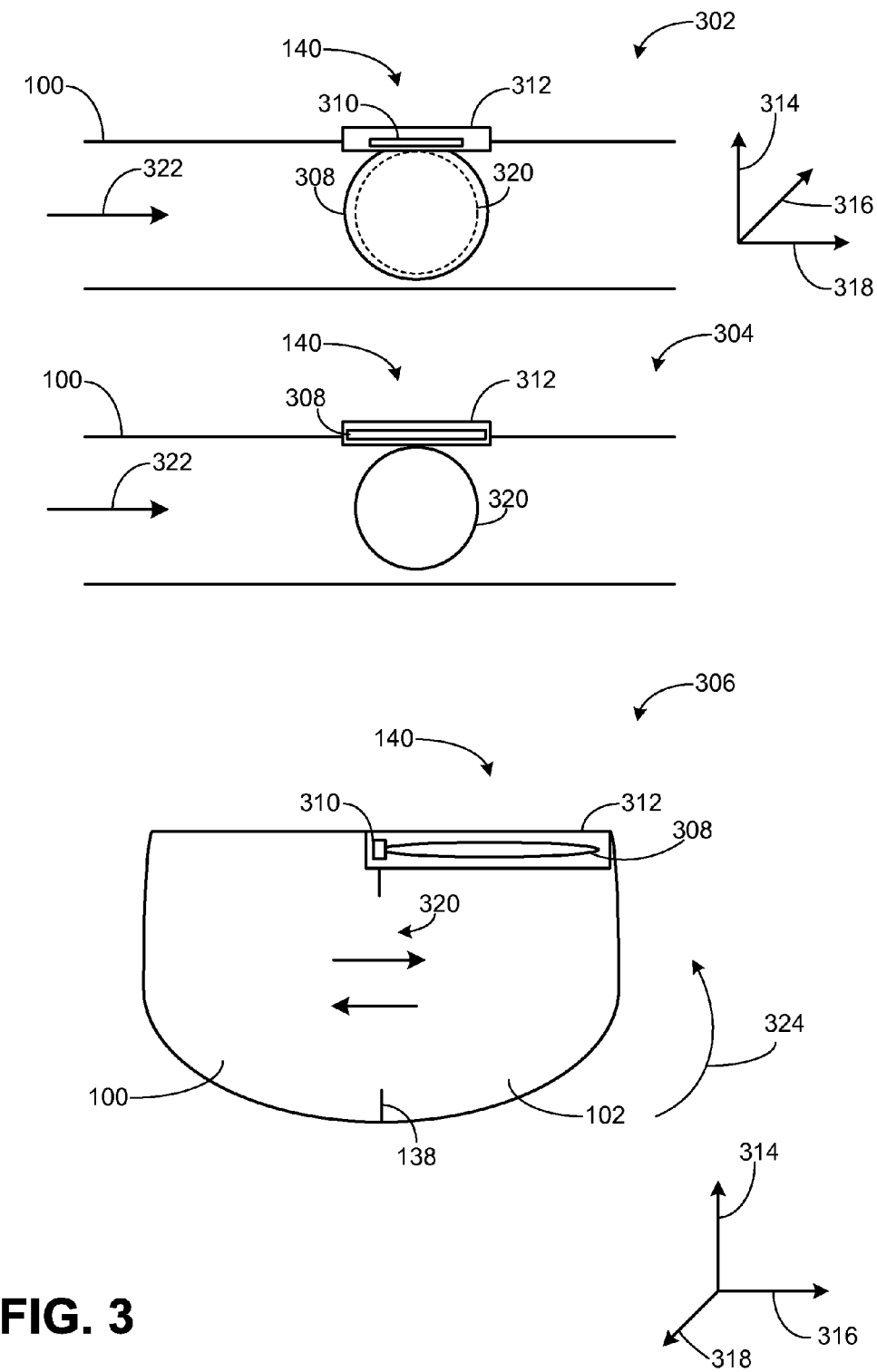
FIG. 3 shows a second embodiment of a branch communication valve for a twin scroll turbocharger system.

FIG. 3 shows a second embodiment of the branch communication valve depicted in FIG. 1. As shown in FIG. 3, the BCV 140 is a side-hinged poppet valve positioned between a first scroll 100 and second scroll 102 and adjacent to a dividing wall 138. FIG. 3 illustrates a first side view 302 of the scrolls and the BCV 140 in which the BCV 140 is in a closed position. FIG. 3 also illustrates a second side view 304 of the scrolls and the BCV 140 in which the BCV 140 is in an opened position. Finally, FIG. 3 illustrates an end-view 306 of the scrolls and the BCV 140 in which the BCV 140 is in an opened position.

The BCV 140 comprises a valve plate 308 and a hinge 310, the valve plate rotatable about the hinge. The hinge 310 is positioned within a recess 312. The recess 312 is positioned within, and at the top of, the second scroll 102. In another example, the recess may be positioned within, and at the top of, the first scroll 100. In an alternate example, the recess may be positioned at the bottom of the first or second scroll.

In the closed position, as shown in the first side view 302, the valve plate 308 of the BCV 140 covers an opening 320 in the dividing wall 138. As such, the opening 320 is positioned between the first scroll 100 and the second scroll 102 such that exhaust gases 322 may pass from one scroll (e.g., first scroll 100), through the opening 320, to the opposite scroll (e.g., second scroll 102). In the closed position, exhaust gases 322 flowing through the first scroll 100, in a horizontal direction defined by a horizontal axis 318, flow past the opening 320, covered by the valve plate 308. The valve plate 308 may be sealable against the dividing wall 138 and opening 320 such that no exhaust gases 322 may pass through the opening 320.

To open the BCV 140, the valve plate 308 may rotate around the hinge 310 and swing upwards, in a direction shown by arrow 324, into the recess 312. This may expose the opening 320 in the dividing wall 138. The opening 320 may be large enough such that when the BCV 140 is open, exhaust gases 322 may pass through the opening 320, thereby increasing fluid communication between the first scroll 100 and the second scroll 102.

In one example, as shown in end-view 306, the recess may be positioned within one of the scrolls (e.g., the second scroll 102), at the ceiling or top of the scroll, with respect to the vertical axis 314 and a surface on which the vehicle sits. In this configuration, the valve plate 308 may cover the opening 320 on the second scroll side of the dividing wall 138 when the BCV 140 is in the closed position. In another example, the recess may be positioned within the first scroll and the valve plate 308 may cover the opening on the first scroll side of the dividing wall 138.

The system of FIG. 3 provides for a dual scroll turbocharger system including a first scroll and a second scroll. The first scroll and the second scroll may be fluidically separated by a dividing wall. The system further includes a recess positioned within a ceiling of the second scroll. Further, the system includes a branch communication valve comprising a valve plate rotatable about a hinge. The hinge may be positioned within the recess and the valve plate may be movable between a first position, wherein the valve plate covers an opening in the dividing wall, and a second position, wherein the valve plate is within the recess.

Figure 4:
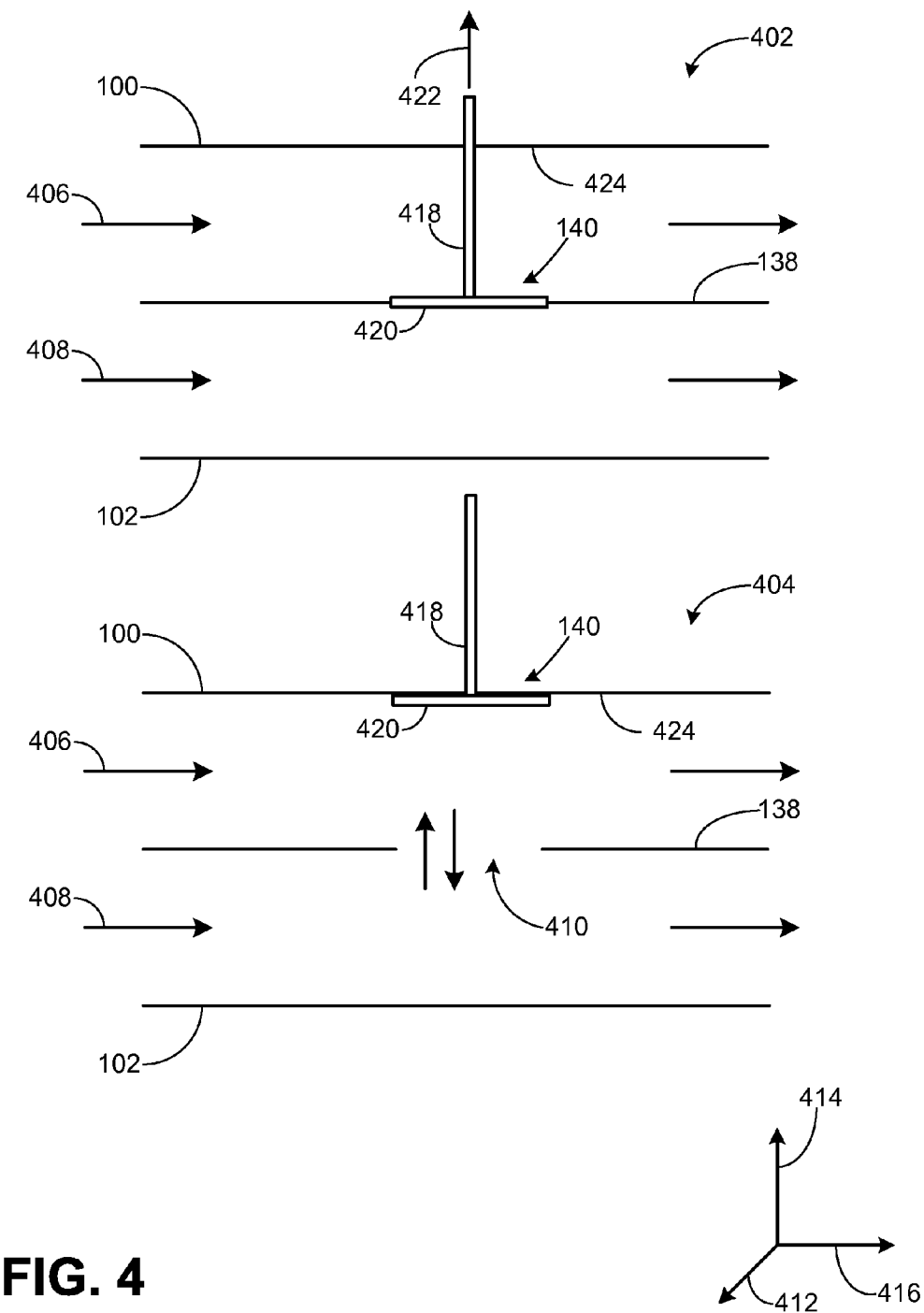
FIG. 4 shows a third embodiment of a branch communication valve for a twin scroll turbocharger system.

FIG. 4 shows a third embodiment of the branch communication valve depicted in FIG. 1. As shown in FIG. 4, the BCV 140 is a linear poppet valve. FIG. 4 includes a first top-view 402 of a first scroll 100, a second scroll 200, and the BCV 140 in which the BCV 140 is in a closed position. FIG. 4 also includes a second top-view 404 of the first scroll 100, the second scroll 200, and the BCV 140 in which the BCV 140 is in an open position. The top-views are oriented along a lateral axis 414 and a horizontal axis 416. The horizontal axis 416 is the direction of exhaust flow through the scrolls. A vertical axis 412 may be oriented with respect to a surface on which the vehicle sits.

The BCV 140 comprises a valve plate 420 and a valve stem 418, one end of the valve stem coupled to the valve plate. The valve stem 418 is positioned across one of the scrolls (e.g., first scroll 100 as shown in FIG. 4). Further, the valve stem 418 may fit through a hole in an outer wall 424 of the first scroll 100. The valve stem 418 may be slideable through this hole in the outer wall 424 and across the first scroll 100. In an alternate example, the valve stem 418 may be positioned across the second scroll 102 and slideable through a hole in an outer wall of the second scroll 102.

In a closed position, as shown in the first top-view 402, the valve plate 420 of the BCV 140 covers an opening 410 in the dividing wall 138. In one example, the opening 410 may be circular to match a circular shape of the valve plate 420. In another example, the opening 410 may be rectangular or square to match a rectangular or square shape of the valve plate 420. Further, the valve plate 420 may be sealable against the dividing wall 138 such that no exhaust gas may pass through the opening 410. As such, there may be no fluid communication between the first scroll 100 and the second scroll 102 when the BCV 140 is in the closed position.

To open the BCV 140 and allow fluid communication between the first and second scrolls, the valve stem 418 may slide in a lateral direction, shown by arrow 422. The valve plate 420 moves with the stem until the valve plate moves all the way across the first scroll to the outer wall 424 of the first scroll. In one example, the valve plate 420 may sit against the outer wall 424 to reduce blocking of flow through the first scroll 100. In another example, the outer wall 424 may have a small recess in the shape of the valve plate 420. The valve plate 420 may then fit within this recess to further reduce flow obstruction in the first scroll 100. When the BCV 140 is opened, exhaust gases 406 from the first scroll 100 may flow through the opening 410 and into the second scroll 102. Similarly, exhaust gases 408 from the second scroll 102 may flow through the opening 410 and into the first scroll 100. In this way, fluid communication between the first and second scrolls may be increased when the BCV 140 is opened.

The system of FIG. 4 provides for a dual scroll turbocharger system including a first scroll and a second scroll. The first scroll and the second scroll may be fluidically separated by a dividing wall. The system further includes a branch communication valve comprising a valve plate and valve stem. The valve plate may be slidable from a first position, wherein the valve plate covers an opening in the dividing wall, across the first scroll to a second position, wherein the valve plate is adjacent to an outer wall of the first scroll.

Figure 5:
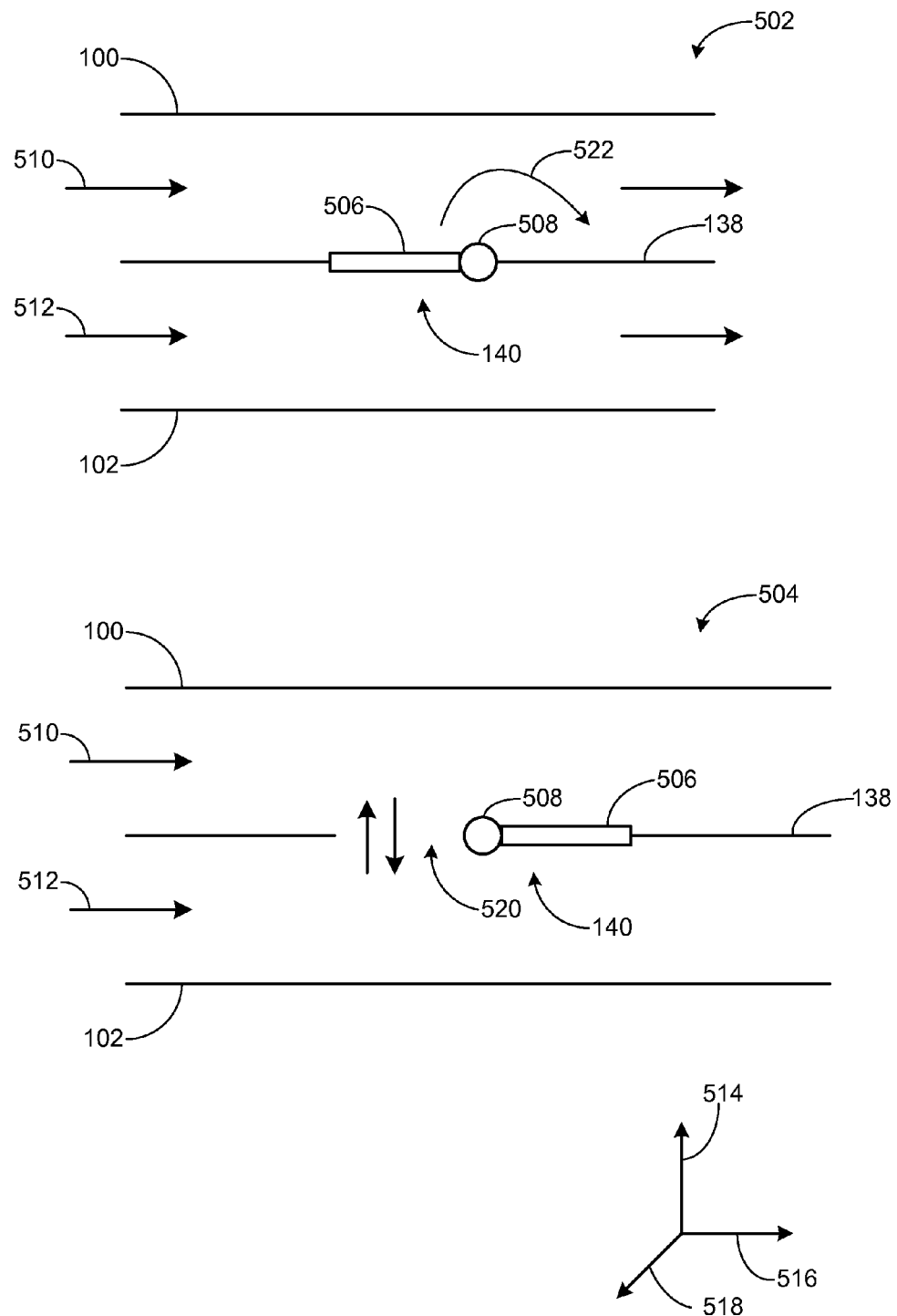
FIG. 5 shows a fourth embodiment of a branch communication valve for a twin scroll turbocharger system.

FIG. 5 shows a fourth embodiment of the branch communication valve depicted in FIG. 1. As shown in FIG. 5, the BCV 140 is a swinging gate-type valve positioned adjacent and parallel to a dividing wall 138 separating a first scroll 100 and a second scroll 102. FIG. 5 includes a first top-view 502 in which the BCV 140 is in a closed position. In this position, exhaust gases 510 in the first scroll 100 remain separated from exhaust gases 512 in the second scroll 102. Thus, when the BCV 140 is in the closed position, there may be no fluid communication or interaction between the first scroll 100 and the second scroll 102. FIG. 5 also includes a second top-view 504 in which the BCV 140 is in an open position. In this position, exhaust gases 510 in the first scroll 100 may flow through an opening 520 in the dividing wall 138 and into the second scroll 102. Similarly, exhaust gases 512 in the second scroll 102 may flow through the opening 520 and into the first scroll 100. As such, fluid communication between the first scroll 100 and the second scroll 102 increases when the BCV 140 is open. The top-views are oriented along a lateral axis 514 and a horizontal axis 516. The horizontal axis 516 is the direction of exhaust flow through the scrolls. A vertical axis 518 may be oriented with respect to a surface on which the vehicle sits.

The BCV 140 comprises a gate 506 and a hinge 508. The gate 506 is rotatable around the hinge 508, the hinge positioned adjacent the dividing wall 138. In one example, the hinge is positioned within the dividing wall 138. In another example, the hinge is positioned in a cavity within the diving wall 138. In yet another example, the hinge 508 is positioned on one side of the dividing wall 138. In a first, closed position, as shown in the first top-view 502, the gate 506 is positioned over (e.g., covering) the opening 520 in the dividing wall 138. The gate 506 may be sealable against the dividing wall 138 such that no exhaust gases may pass through the opening 520.

To open the BCV 140 and increase fluid communication between the first scroll 100 and the second scroll 102, the gate 506 may rotate around the hinge 508 in the direction shown by arrow 522. In an alternate example, the gate 506 may rotate in a direction opposite arrow 522. In a second, open position, as shown in the second top-view 504, the gate 506 is moved away from the opening 520 such that the opening is exposed and exhaust gases may flow through the opening. In one example, in the open position, the gate 506 sits against the dividing wall 138. In another example, in the open position, the gate 506 would sit within a crevice or recess in the dividing wall 138 such that the gate would not obstruct exhaust gas flow through the first scroll 100. Opening the BCV 140 may include swinging or rotating the gate 506 around the hinge 508 such that the gate rotates 180 degrees from a first position on the dividing wall (shown in the first top-view 502) to a second position on the dividing wall (shown in the second top-view 504).

The system of FIG. 5 provides for a dual scroll turbocharger system including a first scroll and a second scroll. The first scroll and the second scroll may be fluidically separated by a dividing wall. The system further includes a branch communication valve comprising a branch communication valve comprising a gate rotatable around a hinge, the hinge positioned adjacent the dividing wall. In one example, the gate may be movable from a first position on the dividing wall, wherein the gate covers an opening in the dividing wall, to a second position on the dividing wall, the second position opposite the first position with respect to a position of the hinge.

Figure 6:
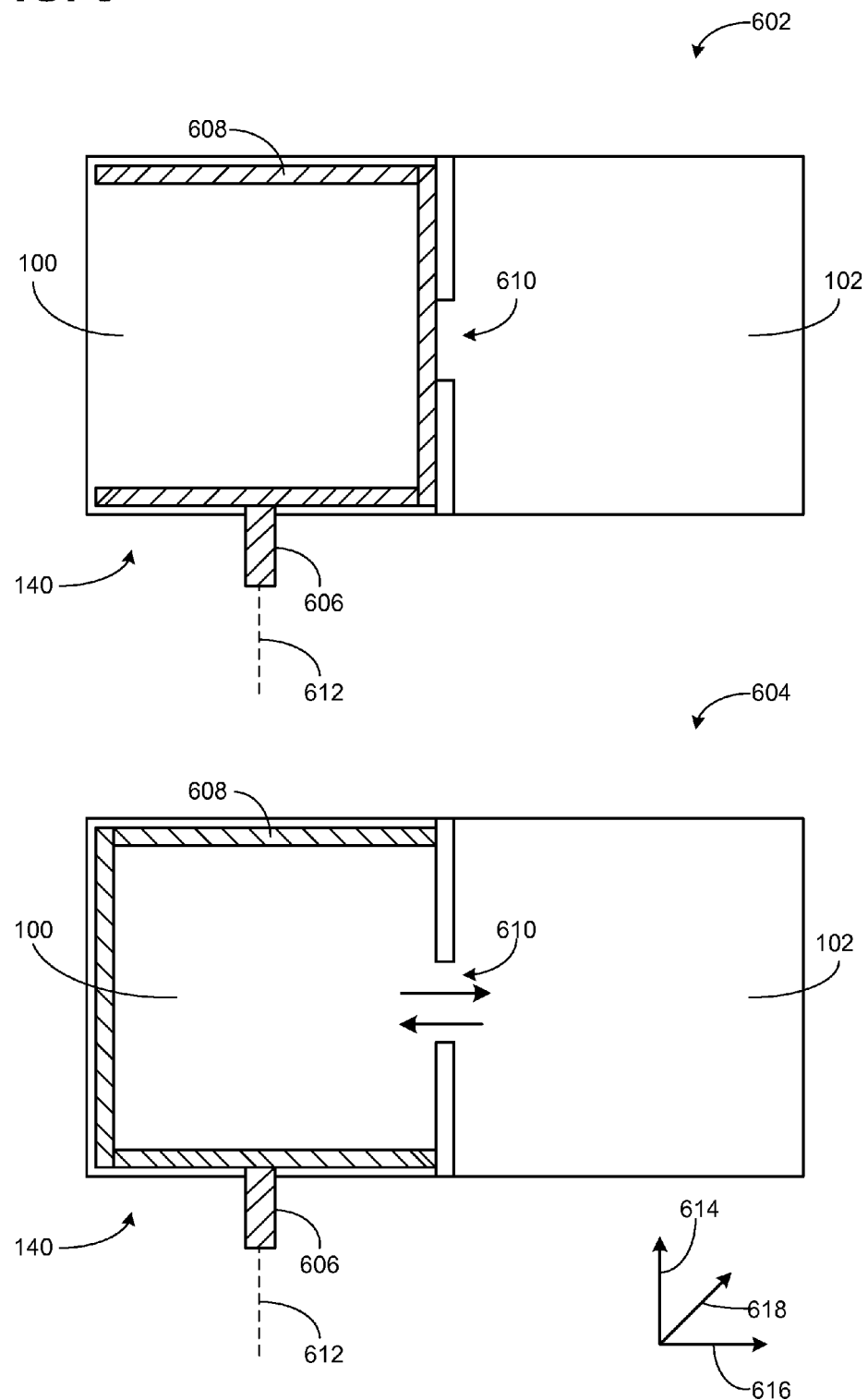
FIG. 6 shows a fifth embodiment of a branch communication valve for a twin scroll turbocharger system.

FIG. 6 shows a fifth embodiment of the branch communication valve depicted in FIG. 1. As shown in FIG. 6, the BCV 140 is a barrel-type valve positioned within one of the scrolls. Specifically, FIG. 6 shows a first end-view 602 of a rectangular flow passage comprising a first scroll 100 and a second scroll 102. In an alternate example, the flow passage may be circular. In the first end-view 602, the BCV 140 is in a closed position such that no exhaust gas flows through a passage or opening 610 between the first scroll 100 and the second scroll 102. As such, no fluid communication occurs between the first scroll 100 and the second scroll 102. FIG. 6 also shows a second end-view 604 in which the BCV 140 is in an open position. In this position, exhaust gases in the first scroll 100 may flow through the opening 610 in the dividing wall 138 and into the second scroll 102. Similarly, exhaust gases in the second scroll 102 may flow through the opening 610 and into the first scroll 100. As such, fluid communication between the first scroll 100 and the second scroll 102 increases when the BCV 140 is open. The end-views are oriented along a vertical axis 614 and a lateral axis 616. A horizontal axis 618 depicts the direction of exhaust flow through the scrolls. The vertical axis 614 may be oriented with respect to a surface on which the vehicle sits.

The BCV 140 comprises a barrel 608 coupled to a shaft 606. The shaft 606 rotates around a rotational axis 612, thereby rotating the barrel within the first scroll 100. The barrel 608 may have three closed sides and one open side.

In a first, closed position (shown in first end-view 602), one of the closed sides is positioned against the dividing wall 138. Specifically, one of the closed sides may be sealable to the dividing wall 138 such that no exhaust gases flow through the opening 610. The shaft 606 is rotated around the rotational axis 612 to move the BCV 140 in to a second, open position (shown in second end-view 604). In the second, open position, the one open side of the barrel 608 is positioned against the dividing wall 138. In this position, the barrel 608 is no longer blocking the opening 610. Thus, exhaust gases flowing through the first scroll 100 may pass through the opening 610 and into the second scroll 102. Similarly, exhaust gasses flowing through the second scroll 102 may pass through the opening 610 and into the first scroll 100.

The system of FIG. 6 provides for a dual scroll turbocharger system including a first scroll and a second scroll. The first scroll and the second scroll may be fluidically separated by a dividing wall. The system further includes a branch communication valve comprising a barrel coupled to a shaft, the shaft rotatable about a rotational axis and wherein rotation of the shaft rotates the barrel from a first position, wherein a closed side of the barrel is positioned adjacent to and covers an opening in the dividing wall, to a second position, wherein an open side of the barrel is positioned adjacent to and does not cover the opening in the dividing wall.

FIG. 7 shows a sixth embodiment of the branch communication valve depicted in FIG. 1. As shown in FIG. 7, the BCV 140 is a sliding-type poppet valve positioned within one of the scrolls. FIG. 7 shows a first top-view 702 of a first scroll 100, a second scroll 102, and the BCV 140. In the first top-view 702, the BCV 140 is in a closed position. In the closed position, there may be no fluid communication between the first and second scrolls. FIG. 7 also shows a second top-view 704 of the first scroll 100, the second scroll 102, and the BCV 140. In the second top-view 704, the BCV 140 is in an open position. In the open position, there may be fluid communication between the first and second scrolls. The top-views are oriented along a lateral axis 714 and a horizontal axis 716. The horizontal axis 716 is the direction of exhaust flow through the scrolls. A vertical axis 718 may be oriented with respect to a surface on which the vehicle sits.

The BCV 140 comprises a sliding valve plate 706 coupled to a shaft 708. The shaft 708 is positioned across the first scroll 100. In an alternate example, the shaft 708 may be positioned across the second scroll 102. As shown in FIG. 7, the shaft 708 is oriented perpendicular to the flow path of the first scroll 100. In one example, the shaft may be positioned within the center of the first scroll 100. The shaft 708 may slide the valve plate 706 along the dividing wall 138. In an alternate embodiment, the valve plate 706 may slide along the shaft 708 to move along the dividing wall 138.

In a first, closed position (as shown in first top-view 702), the valve plate 706 is positioned adjacent to the dividing wall 138 and covers an opening 710 in the dividing wall. The valve plate may be sealable against the dividing wall 138 such that no exhaust gas may pass through the opening 710. To open the BCV 140, the shaft 708 slides the valve plate 706 along the dividing wall, in a horizontal direction shown by arrow 712. In a second, open position (as shown in second top-view 704), the valve plate 706 is adjacent to the dividing wall and in a position further down the first scroll 100 on the dividing wall 138, with respect to the direction of exhaust flow. In the open position exhaust gases 510 in the first scroll 100 may pass through the opening 710 and into the second scroll 102. Similarly, exhaust gases 512 in the second scroll 102 may pass through the opening 710 and into the first scroll 100. In this way, when the BCV 140 is opened, fluid communication between the first and second scrolls increases.

The system of FIG. 7 provides for a dual scroll turbocharger system including a first scroll and a second scroll. The first scroll and the second scroll may be fluidically separated by a dividing wall. The system further includes a branch communication valve comprising a sliding valve plate positioned adjacent to the diving wall and coupled to a shaft. The shaft may move the sliding valve plate from a first position, wherein the valve plate covers an opening in the dividing wall, to a second position, away from, along a horizontal axis, the opening.

Figure 8:
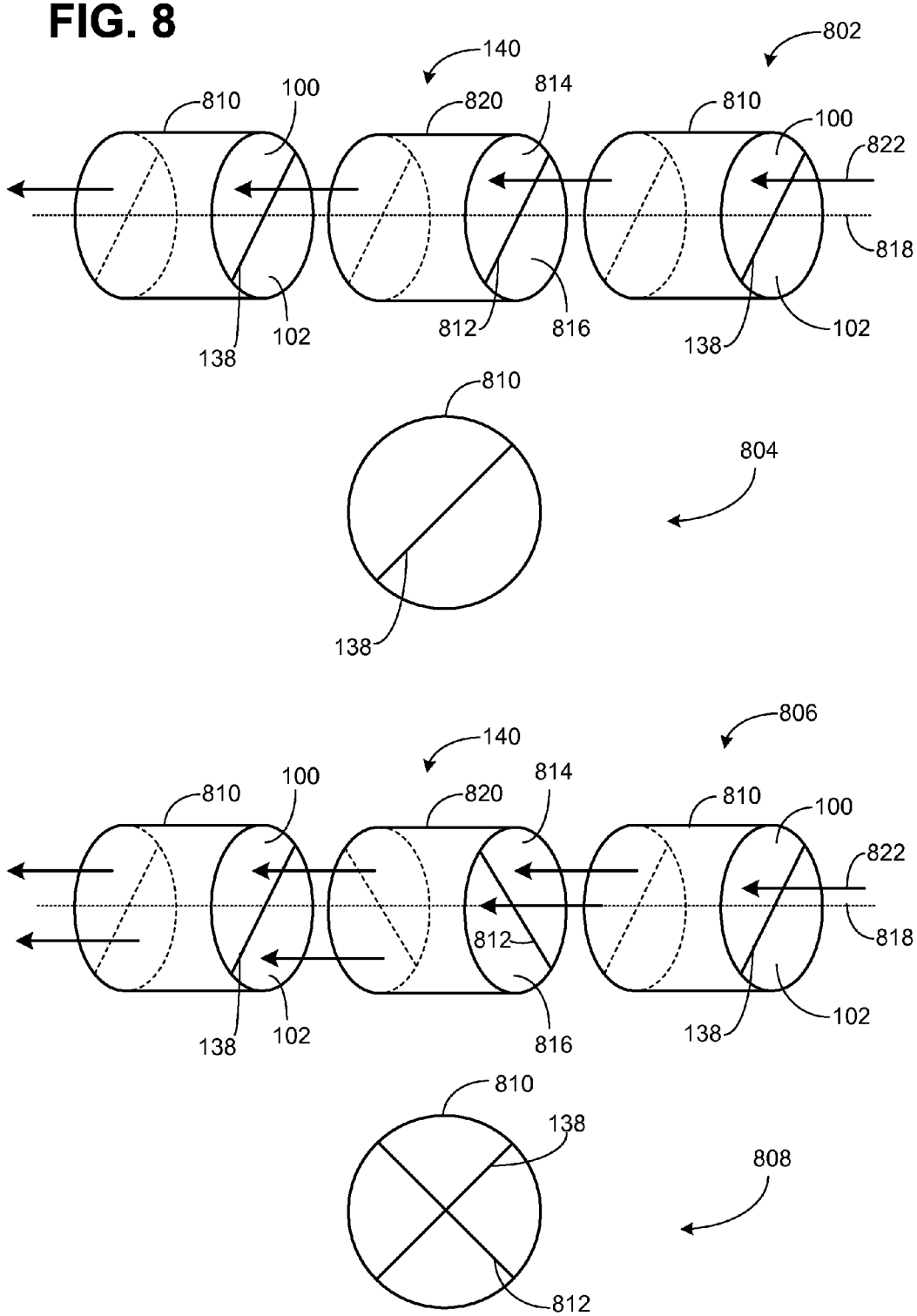
FIG. 8 shows a seventh embodiment of a branch communication valve for a twin scroll turbocharger system.

FIG. 8 shows a seventh embodiment of the branch communication valve depicted in FIG. 1. As shown in FIG. 8, the BCV 140 is a rotating valve positioned within a flow passage 810 (e.g., exhaust flow passage) which contains the first scroll 100 and the second scroll 102. An interior dividing wall (e.g., dividing wall 138) separates the exhaust gases traveling through the first scroll 100 and the second scroll 102. The BCV 140 in the seventh embodiment has a valve dividing wall 812 which partitions a valve body 820 into a first flow chamber 814 and a second flow chamber 816. The BCV 140 is rotatable about a rotational axis 818.

A first view 802 shows the BCV 140 in a closed position. In the closed position, the valve dividing wall 812 is in-line with (e.g., parallel to) the dividing wall 138. In this configuration, exhaust gases 822 traveling through the first scroll 100 remain separated from the second scroll 102. For example, exhaust gases traveling through the first scroll 100 travel only through the first flow chamber 814 and exhaust gases traveling through the second scroll 102 travel only through the second flow chamber 816. A front view 804 of the BCV 140 in the closed position shows a view of the flow passage 810, along the rotational axis 808. In this view, only one dividing line (diving wall 138) is seen since the dividing wall 138 of the flow passage 810 is in-line with the valve dividing wall 812.

A second view 806 shows the BCV 140 in an open position. As shown in FIG. 8, the BCV 140 rotates by 180 degrees, around the rotational axis 818, from the closed position to the open position. In alternate embodiments, the open position may be a position less than 180 degrees from the closed position. In the open position, the valve dividing wall 812 is offset from the dividing wall 138 of the flow passage 810. In the example shown in FIG. 2, the valve dividing wall 812 and the dividing wall 138 are perpendicular. In this configuration, exhaust gases 822 traveling through the first scroll 100 do not remain separated from the second scroll 102. For example, exhaust gases traveling through the first scroll 100 may enter both the first flow chamber 814 and the second flow chamber 816, thereby allowing mixing of exhaust gases and fluid communication between the first scroll 100 and the second scroll 102. Gases exiting the valve body 820 through the first flow chamber 814 may then flow through the first scroll 100 and the second scroll 102. Likewise, gases exiting the valve body 820 through the second flow chamber 816 may then flow through the first scroll 100 and the second scroll 102. A front view 808 of the BCV 140 in the open position shows a view of the flow passage 810, along the rotational axis 808. In this view, both the diving wall 138 and the valve dividing wall 812 are seen since the valve dividing wall 812 is now perpendicular to the dividing wall 138 of the flow passage 810. Thus, rotating the valve body 820 around the rotational axis 818 to open the BCV 140 may increase fluid communication between the first scroll 100 and the second scroll 102.

The system of FIG. 8 provides for a dual scroll turbocharger system including an exhaust flow passage with an interior dividing wall, the interior dividing wall partitioning the flow passage into a first scroll and a second scroll. The system further includes a branch communication valve positioned within the exhaust flow passage. The branch communication valve may comprise a first chamber and a second chamber separated by a valve dividing wall. Further, the branch communication valve may be rotatable around a rotational axis.

FIG. 9 shows a eighth embodiment of the branch communication valve depicted in FIG. 1. As shown in FIG. 9, the BCV 140 is a sliding valve positioned within a dividing wall 138. The dividing wall separates a first scroll 100 and a second scroll 102. The BCV 140 comprises a cylindrical block 908 slideable between an open, closed, or plurality of intermediate positions between fully open and fully closed. A first side view 902 shows the BCV 140 in a closed position. In the closed position there may be no fluid communication between the first scroll 100 and second scroll 102. A second side view 906 shows the BCV 140 in an open position. In the open position exhaust gases may pass through an opening 922 in the dividing wall 138, thereby allowing fluid communication between the first scroll 100 and the second scroll 102. A front view 904 shows a position of the BCV 140 within the dividing wall 138. As shown in this view, the BCV 140 may be centered along the dividing wall 138. Thus, the BCV 140 separates the first scroll 100 from the second scroll 102.

As shown in the first side view 902 and the second side view 906, the cylindrical block 908 is coupled at a first end to a first end of a spring 910. A second end of the spring 910 is coupled to a first interior wall 912. The first interior wall 912 is positioned within a cavity 914 within the dividing wall 138. The cavity 914 is formed by the first interior wall 912, a second interior wall 916, a first side interior wall 918, and a second side interior wall 920. In a closed position (as shown in first side view 902), a second end of the cylindrical block 908 is sealable against the second interior wall 916.

In one example, the BCV 140 may be a passive sliding valve wherein a pressure of the exhaust flow traveling through the first scroll 100 and the second scroll 102 determines a position of the BCV 140. For example, when the flow pressure on a front surface 926 (shown in front view 904) of the BCV 140 (and cylindrical block 908) is below a threshold pressure, the valve may remain closed. The threshold pressure may be based on a stiffness, or spring constant, of the spring 910. For example, if the stiffness of the spring 910 increases, the threshold pressure may also increase. As such, a high flow pressure is required to open the valve. Alternatively, when the flow pressure on the front surface 926 is greater than the threshold pressure, the cylindrical block 908 may be pushed along with the exhaust gas flow 928. Specifically, the cylindrical block 908 may slide into the cavity 914, in a horizontal direction, as shown by arrow 924. As the cylindrical block 908 slides into the cavity 914, the spring 910 compresses against the first interior wall 912. As a result, an opening 922 increases in the dividing wall 138. The opening 922 allows exhaust gases from the first scroll 100 to enter the second scroll and exhaust gases from the second scroll 102 to enter the first scroll 100.

The system of FIG. 9 provides for a dual scroll turbocharger system including a first scroll and a second scroll. The first scroll and the second scroll may be fluidically separated by a dividing wall. The system further includes a cavity positioned within the dividing wall and a branch communication valve positioned within the cavity. The branch communication valve may comprise a cylindrical block coupled to a first end of a spring, a second end of the spring coupled to an interior wall of the cavity. The cylindrical block may be slidable within the cavity between a sealed, closed, position and an open position. When in the open position, an opening between the first scroll and the second scroll is created, thereby fluidically combining the two scrolls. When in the closed position, the cylindrical block is sealable against a second interior wall. Further, the cylindrical block may slide from the closed position to the open position when a flow pressure of an exhaust flow traveling through the first scroll and the second scroll increases above a threshold pressure and wherein the threshold pressure is based on a stiffness of the spring.

In this way, a branch communication valve may be opened or closed to increase or decrease fluid communication between a first scroll and a second scroll of a twin scroll turbocharger. In one example, the branch communication valve may be positioned within a flow passage, the flow passage positioned adjacent a dividing wall separating the first scroll and the second scroll. Further, an opening in the flow passage may bridge the first scroll and the second scroll such that exhaust gases from the two scrolls may enter the flow passage and the opposite scroll when the branch communication valve is opened. In another example, the branch communication valve may be positioned within the dividing wall. In a closed position, the branch communication valve may cover and opening within the dividing wall, between the first and second scrolls. In an open position, the branch communication valve may expose the opening such that exhaust gases from the first scroll may enter the second scroll and exhaust gases from the second scroll may enter the first scroll. The branch communication valve may be of various types, including a side-hinged poppet valve, a linear poppet valve, a swinging gate-type valve, a sliding poppet valve, a barrel-type valve, a rotating valve, and/or a sliding valve (within a cavity in the dividing wall). In this way, the branch communication valve may increase or decrease fluid communication between a first and second scroll in a dual scroll turbocharger.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A dual scroll turbocharger system, comprising:
   a first scroll and a second scroll of a dual scroll turbocharger, fluidically separated by a dividing wall;
   a cavity positioned within the dividing wall; and
   a branch communication valve positioned within the cavity, the branch communication valve comprising a cylindrical block coupled to a first end of a spring, a second end of the spring coupled to an interior wall of the cavity, and wherein the cylindrical block is slidable within the cavity between a closed position and an open position.

2. The system of claim 1, wherein in the closed position, the cylindrical block is sealable against a second interior wall, and wherein in the open position, an opening between the first scroll and the second scroll is created, thereby fluidically combining the two scrolls.

3. The system of claim 1, wherein the cylindrical block slides from the closed position to the open position when a flow pressure of an exhaust flow traveling through the first scroll and the second scroll increases above a threshold pressure, and wherein the threshold pressure is based on a stiffness of the spring.

\* \* \* \* \*